(12) United States Patent
Aaron et al.

(10) Patent No.: US 11,803,765 B2
(45) Date of Patent: Oct. 31, 2023

(54) PUBLIC POLICY RULE ENHANCEMENT OF MACHINE LEARNING/ARTIFICIAL INTELLIGENCE SOLUTIONS

(71) Applicant: AT&T Intellectual Property I, L.P., Atlanta, GA (US)

(72) Inventors: Jeffrey Aaron, Atlanta, GA (US); James Fan, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 714 days.

(21) Appl. No.: 16/427,753

(22) Filed: May 31, 2019

(65) Prior Publication Data
US 2020/0380381 A1    Dec. 3, 2020

(51) Int. Cl.
*G06F 9/44* (2018.01)
*G06N 5/02* (2023.01)
*G06Q 10/067* (2023.01)
*G06N 20/00* (2019.01)
*G06F 9/445* (2018.01)

(52) U.S. Cl.
CPC ......... *G06N 5/027* (2013.01); *G06F 9/44526* (2013.01); *G06N 20/00* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 10,013,416 B1* | 7/2018 | Bhardwaj | G06N 20/00 |
| 11,392,840 B2* | 7/2022 | Santhanam | G06N 20/00 |
| 2016/0292574 A1* | 10/2016 | Salam | G06N 20/00 |
| 2017/0249645 A1* | 8/2017 | Saitta | G06Q 50/26 |
| 2018/0034922 A1* | 2/2018 | Gopalan | G06N 20/00 |
| 2018/0114123 A1* | 4/2018 | Kim | G06N 5/025 |
| 2018/0253209 A1* | 9/2018 | Jaygarl | G06F 9/451 |
| 2019/0286759 A1* | 9/2019 | Wilkins | G06N 3/0427 |
| 2019/0354895 A1* | 11/2019 | Vasudevan | G06N 20/00 |
| 2020/0112590 A1* | 4/2020 | Bhatia | G06N 20/20 |
| 2020/0410399 A1* | 12/2020 | Lang | G06N 3/08 |

* cited by examiner

*Primary Examiner* — Insun Kang
(74) *Attorney, Agent, or Firm* — GUNTIN & GUST, PLC; Robert Gingher

(57) ABSTRACT

A method includes creating one or more first policy shims to be applied to a ML/AI module, applying the one or more first policy shims to an input or an output of the ML/AI module and executing the ML/AI module on a data set in response to the applying step. The one or more first policy shims includes an input policy shim and an output policy shim and the applying step includes applying the input policy shim to the data set prior to the executing step and applying the output policy shim to an output of the executing step.

18 Claims, 8 Drawing Sheets

PUBLIC POLICY RULE ENHANCEMENT OF MACHINE LEARNING/ARTIFICIAL INTELLIGENCE SOLUTIONS

TECHNICAL FIELD

This disclosure relates generally to adaptation of machine learning and artificial intelligence algorithms, and more particularly, to a system and method for inserting policy controls into such algorithms.

BACKGROUND

There is a growing body of technology for a variety of applications incorporating machine learning (ML) and artificial intelligence (AI). While these terms are often used interchangeably, the two terms do have different meanings. Artificial Intelligence is the broader concept of machines being able to carry out tasks in a way that we would consider "smart". Machine Learning is a current application of AI based around the idea that by giving machines access to data and the machines would learn for themselves. While applicants embrace these differences, for the purposes of this disclosure, the two will be used interchangeably or together as ML/AI unless otherwise specifically set forth herein. The word "module" in the claims will refer to either a ML module or an AI module or a combination of ML/AI modules.

In practice, there's often a very strong, natural resistance to using what may be called automation involving a "black box" processor, including ML/AI applications. These types of applications may be avoided by operators and users due to uncertainty, lack of confidence, fear of no immediate or explicit control of the applications, lack of flexible controls, or other reasons. There is a general lack of ability to understand the details of such black box approaches. Even as such black box approaches become more essential, meaning the applications cannot simply be switched off if there's a problem, it is critical to provide additional means of control and flexibility. Moreover, ML/AI algorithms take time to develop and train, making changes to ML/AI algorithms difficult to adjust or modify or even debug.

There is a need for a system and method or providing visibility, flexibility and controllability to ML/AI applications in order to foster additional development and deployment of such applications and to quickly and easily modify such ML/AI applications once deployed.

SUMMARY

The present disclosure directed to a method including creating one or more first policy shims to be applied to a ML/AI module, applying the one or more first policy shims to an input or an output of the ML/AI module, executing the ML/AI module on a data set in response to the applying step. The method may also include wherein the one or more first policy shims includes an input policy shim and an output policy shim and the applying step comprises applying the input policy shim to the data set prior to the executing step and applying the output policy shim to an output of the executing step. The ML/AI module may be one of a plurality of nested ML/AI modules and the creating step may include creating one or more additional policy shims for at least one of the plurality of nested modules and wherein the applying step applies the one or more additional policy shims to the one of the plurality of nested modules and wherein the executing step includes executing the nested ML/AI modules in response to the applying step. The additional one or more data sets may be inserted into the plurality of nested ML/AI modules prior to the executing step. In an aspect, the creating step includes creating one or more substitute policy shims and further comprising overriding the one or more first policy shims and the applying step comprises applying the one or more substitute policy shims instead of the one or more first policy shims. The method may further include storing the one or more first policy shims in a database and retrieving the stored one or more first policy shims prior to the applying step. In an aspect, the one or more first policy shims is a filter configured to act on the dataset or a set of business rules. In an aspect, the creating step includes creating one or more substitute policy shims and further comprising overriding the one or more first policy shims and the applying step comprises applying the one or more substitute policy shims instead of the one or more first policy shims and wherein the applying step is initiated by an external input. In an aspect, the external input is one of a weather alert and an emergency alert or alternatively may be one or more business rules. In an aspect, the ML/AI module is modified based on the executing step and whereby the one or more policy shims are no longer used.

The present disclosure is also directed to a method including creating a plurality of ML/AI modules wherein the ML/AI modules are nested in a two-stage process, creating a policy shim, applying the policy shim after one of the plurality of ML/AI modules is executed on a data set after a first stage of the two-stage process, selecting a second ML/AI module from the plurality of ML/AI modules based on the applying step, executing the second ML/AI module on an output of the applying step as a second stage of the two-stage process. The method may further include modifying the policy shim and wherein the second ML/AI module is changed from the selected second ML/AI module to another of the plurality of the ML/AI modules based on the applying step. In an aspect, the policy shim is one of a filter and a business rule.

The disclosure is also directed to an apparatus including a policy database configured for storing a plurality of policies, an input-output interface, a processor coupled to the input-output interface wherein the processor is coupled to a memory, the memory having stored thereon executable instructions that when executed by the processor cause the processor to effectuate operations including creating one or more first policy shims from the plurality of policies, deciding which of the one or more first policy shims is to be applied to a ML/AI module, and applying the one or more first policy shims to an input or an output of the ML/AI module. The operations may further include creating a substitute policy shim and wherein the input/output interface includes receiving an input from an external source and overriding the one or more first policy shims with the substitute policy shim. In an aspect, the substitute policy is a filter or a business rule. In an aspect, the operations may further include creating a safety policy shim and wherein the input/output interface includes receiving an input from an external source and overriding the one or more first policy shims with the safety policy shim and wherein the safety policy shim is a filter or a business rule to be applied based on a safety concern.

BRIEF DESCRIPTION OF THE DRAWINGS

In the following description, for purposes of explanation, numerous specific details are set forth in order to provide an understanding of the variations in implementing the dis

DETAILED DESCRIPTION

Overview. As detailed herein, the present disclosure is directed to a system and method for adding policy capabilities in a ML/AI application in a unique manner such that rules can be applied to the interconnections, inputs, and outputs of ML/AI modules to enable a hybrid type of enhancement not previously considered. The disclosed policy use in accordance with the present disclosure provides a flexible and powerful tool to inject multiple and various sorts of controls into a ML/AI fabric solution, which can be used in multiple ways to accomplish essential needs. As such, the present disclosure provides a framework around the ML/AI to enhance its functionality and provide additional controllability, thus making ML/AI more usable across a broader range of applications.

The disclosure provides a unique and innovative hybrid approach to providing policy capabilities for ML/AI execution. A centralized or distributed policy decision engine connects to shims or modules that can be inserted at any point in a modular ML/AI solution, including for example, at the overall inputs as well as the overall output. The shims may provide the ability to filter, modify, augment, select or perform any other policy functions at the inputs and/or outputs of each ML/AI module, such that the basic "black box" behavior may be controlled. Where feasible and reasonable, policy rules could also control points inside ML/AI models or sub-models, including via filtering, modifying, augmenting, switching, and altering parameters, and the like. One or more component models or sub-models may also be switched, selecting the best of each for current conditions from among a number of related but different versions.

Using this hybrid approach, innovative types of feedback could be enabled by policy as well, with the inputs being from outside the ML/AI models or sub-models and/or inside those ML/AI models or sub-models. Also, explicit business rules may be applied in various ways. The otherwise opaque behavior of each ML/AI module in the model, plus the solution as a whole, may thus be augmented or enhanced in order to give users/operators more flexible control and explicit command of the system, ensuring additionally practical ability to use ML/AI solutions.

Figure 1:
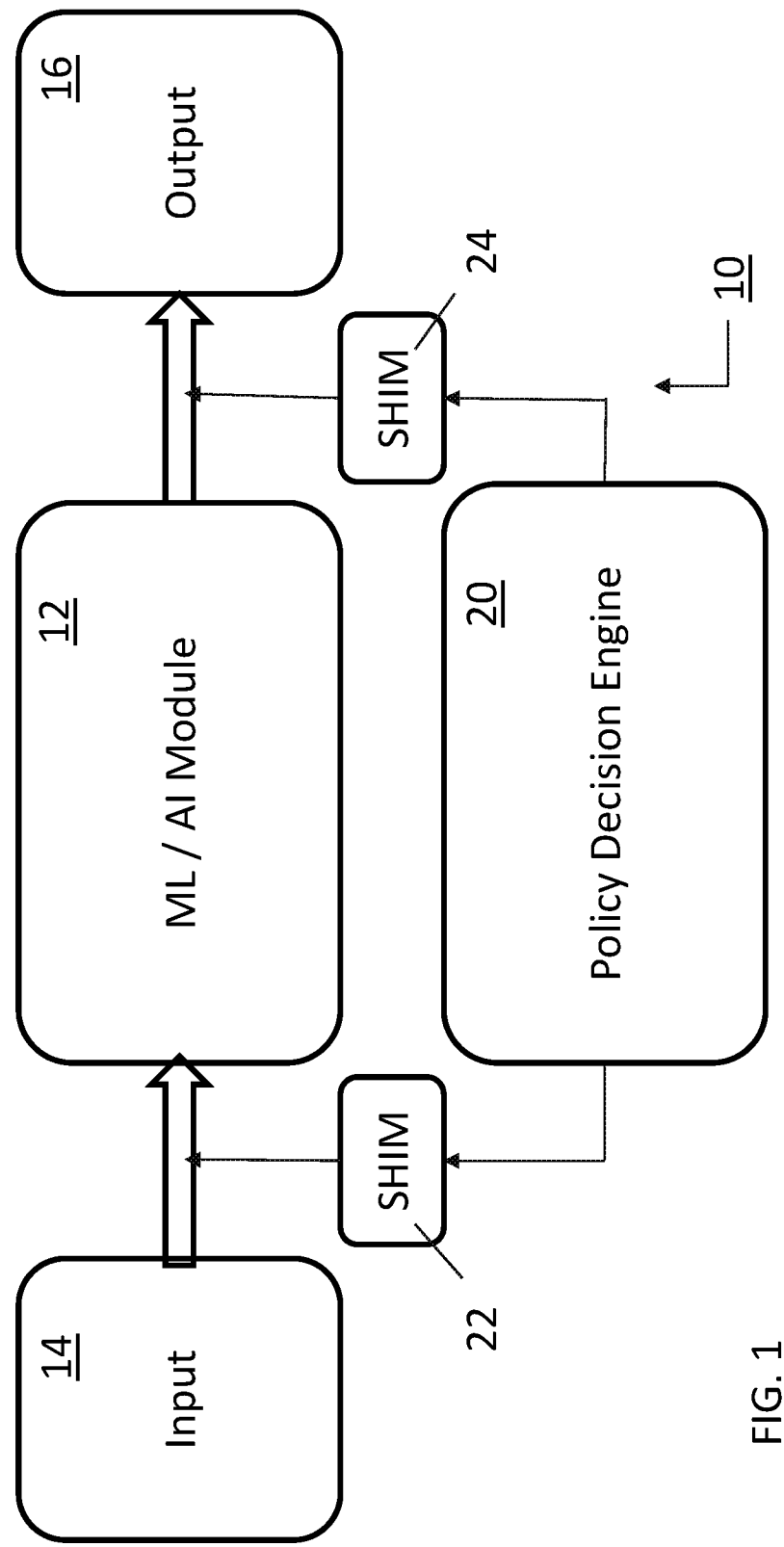
- FIG. 1 is a representation of an exemplary configuration showing a policy decision engine interacting with a ML/AI module.

System Architecture. In an aspect and with reference to FIG. 1, there is shown a system 10 having a modular ML/AI module 12 having inputs 14 and outputs 16. There is also shown a centralized policy decision engine 20 connected to shims 22, 24 that can be inserted at any point in a modular ML/AI solution 12. While the policy module 20 shown in FIG. 1 is centralized, in an aspect, the policy decision engine 20 may be distributed in an operating environment. There is shown input shim 22 and output shim 24 which may provide the capability to filter, modify, augment, or any provide any other functional operation on the inputs 14 and/or outputs 16 of each ML/AI module 12, respectively. Shims 22, 24 may be filters, but may also selectively substitute values for particular inputs under specified conditions, either using default, synthetic, or artificial values. In an open source environment, shims could be added to data brokers in ACUMOS, implemented in operating systems engines such as XACML & Drools, or as add-ons to any ML/AI architecture.

The architecture 10 of FIG. 1 provides access to control the basic "black box" behavior of ML/AI module 12. In an aspect, policy rules may be developed to control points inside of the ML/AI module 12 by providing filtering, modifying, augmenting, switching, altering parameters, or other functions. In accordance with the present disclosure, there may be a policy decision engine 20 which interacts with the inputs 14 and/or output 16 of the ML/AI module 12 through shims 22 24, respectively. On the input 14 side, shim 22 may provide, for example, filtering of input data streams or selection of one of a plurality of input data streams based on the policies generated by the policy decision engine 20. Likewise, on the output 16 side, shim 24 may provide, for example, filtering of output data streams in accordance with the policies. While filtering or selection are exemplary operations, it will be understood that other policy operations such as business rules or other policies may be provided on the input 14 through shim 22 or on the output 16 through shim 24.

Figure 2:
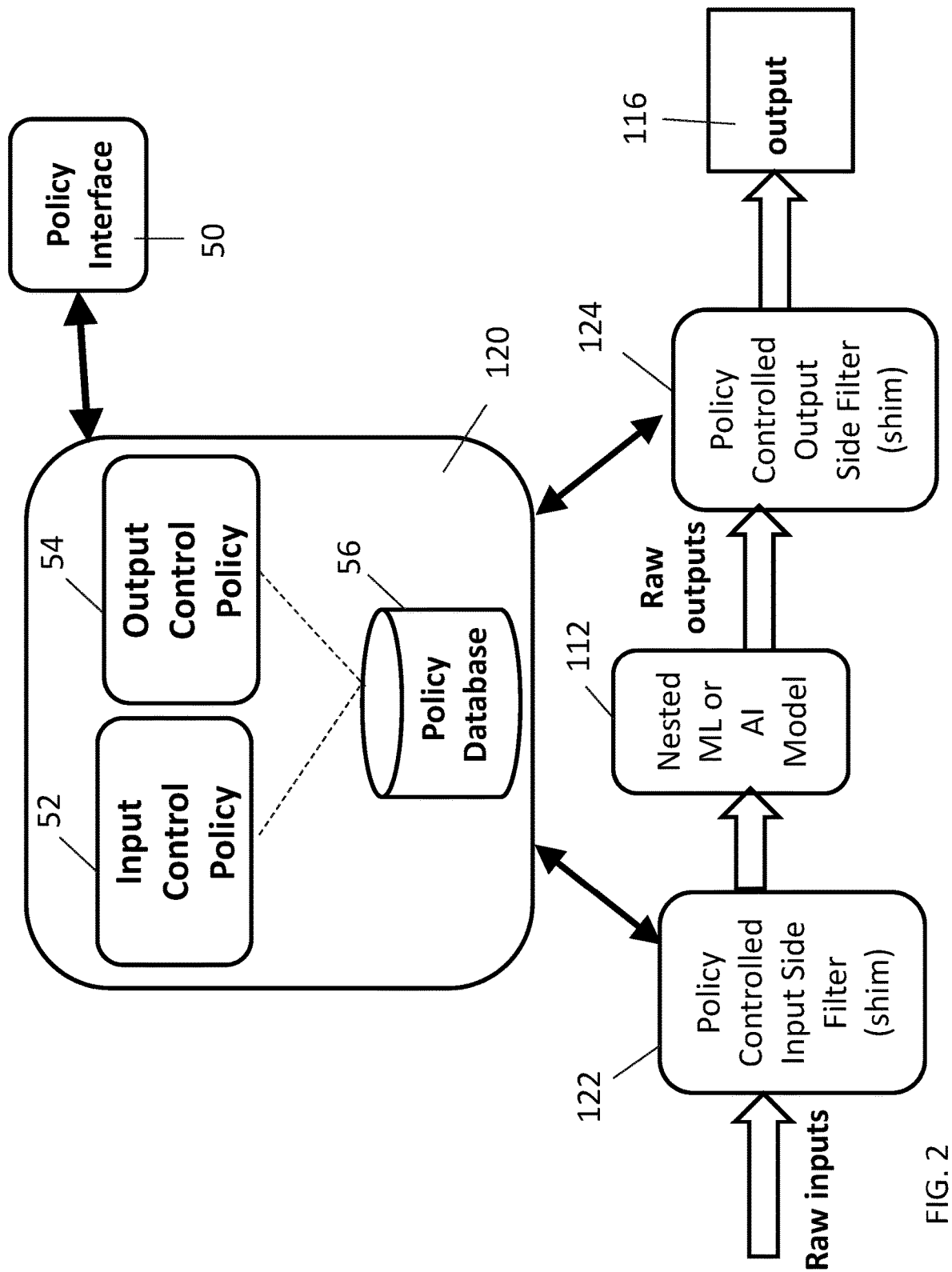
FIG. 2 is a more detailed representation of the exemplary configuration in FIG. 1.

With reference to FIG. 2, there is shown a more detailed exemplary diagram of FIG. 1. Policy interface 50 is shown which provides a user, programmer or perhaps even another computer the ability to interact with policy decision engine 120. The policy interface 50 may determine any number of policies to be applied to one or more ML/AI modules or inserted into a string of ML/AI modules. The policy decision engine 120 may include an input control policy function 52 which may, for example, include a policy to conditionally block or allow various inputs to a nested ML/AI module 112. The policy decision engine 120 may also include an output control policy function 54 which may, for example, include a policy to conditionally block or allow various outputs from the nested ML/AI module 112. These policies may be stored in a policy database 56 which may, for example, contain a plurality of input control policy functions 52 and output control policy functions 54 to be applied to the raw inputs to the nested ML/AI module 112 through shim 122 or to the raw outputs of the nested ML/AI module 112 through shim 124 to derive output 116.

Figure 3:
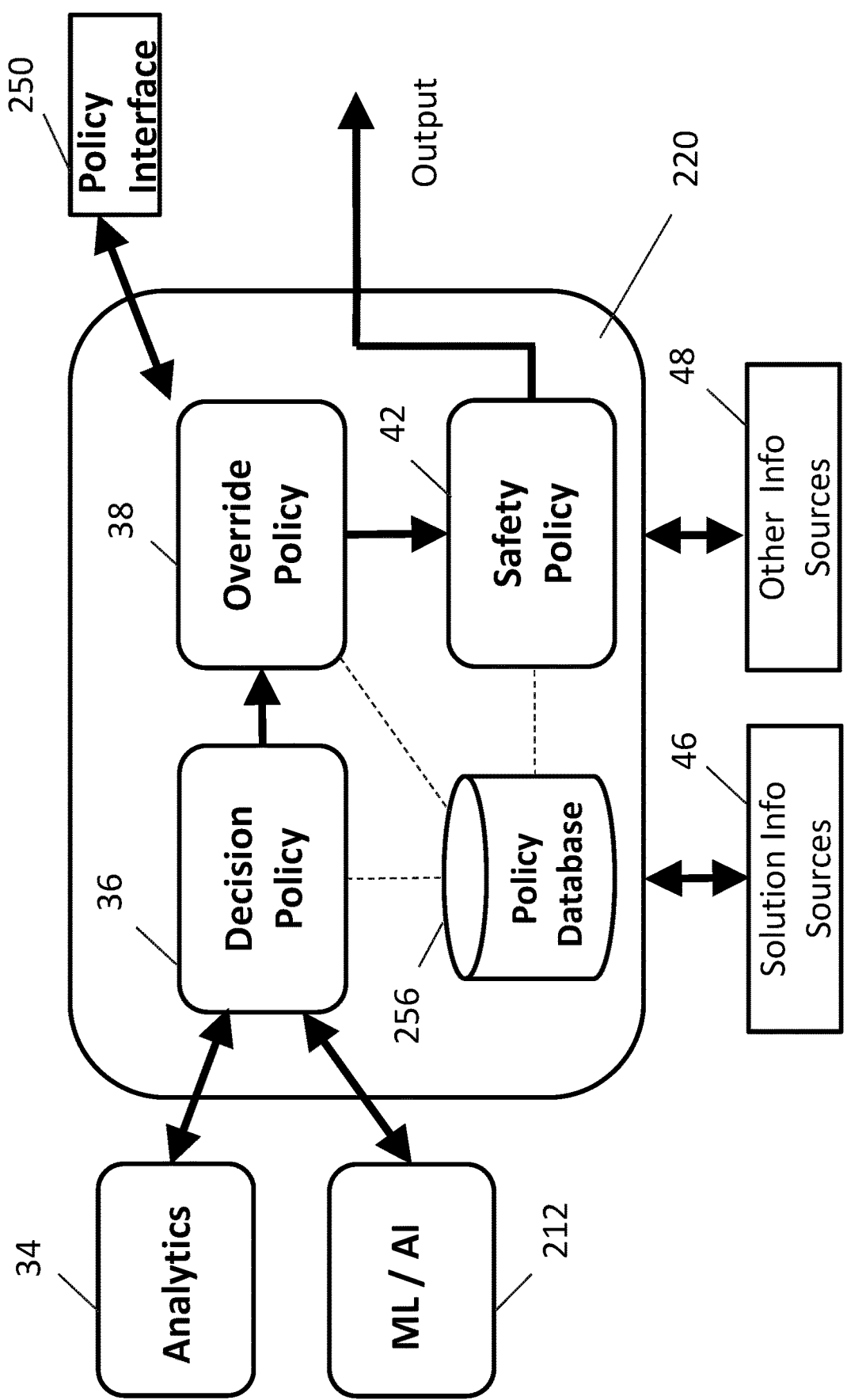
FIG. 3 is a representation of an exemplary policy decision engine.

FIG. 3 shows an exemplary diagram of the policy decision engine 220. The policy decision engine 220 may include a decision policy function 36, an override policy function 38, a safety policy function 42, and a policy database 256 in which to store and later access or retrieve the respective policies. The decision policy function 36 may be configured to make decisions based on thresholds, rules, history, operational state and the like to choose between various analytics and/or ML/AI algorithms, and to choose inputs or outputs associated with such analytics and/or ML/AI algorithms. The decision policy function 36 may for example, provide the current conditional policies for the ML/AI module 212 as described above. The decision policy function 36 may interface to an analytics function 34 and/or the ML/AI models 212 and affect operating decisions between and among the two. The decision policy function 36 may interface and interact with an override policy function 38 which may, for example, be configured to allow for quick fixes, priority overrides, emergency controls and the like. The override policy function 38 may also interact with the safety policy function 42 which may, for example, enable the operator or programmer to provide explicit definitions of situations to avoid and to otherwise disallow selected scenarios from occurring. The policy rules, decision history, decision state and the like may be stored in the policy database 256.

The policy decision engine 220 may be controlled through policy interface 250. The policy interface 250 may a user interface or a machine-to-machine interface through which policies may be defined and overridden. In an aspect, solution information from other sources, represented by block 46, may interface with the policy decision engine 220. Likewise, other and perhaps extraneous to the system, information from other sources, represented by block 48, may interface with the policy decision engine 220. By way of example only, relevant ambient conditions such as weather or emergency situations may be input into the policy decision engine 220 through block 48. Budget or other financial situations may be input into the policy decision engine 220 through block 46. As such, any extraneous or other conditions which may affect how the ML/AI module 212 may be managed by the policies can be accounted for. For example, in an ML/AI application in which the application decides what a potential fix for a system would be and whether to authorize a truck roll to the customer site, the policy decision engine 220 may receive information from block 48 that there is a severe weather alert and that it would be dangerous to send a truck to a customer site. The safety policy function 42 may then alert the override policy function 38 to change the decision policy function 36 to prevent a truck roll to the customer site at that time and instead, recommend remote solutions, but perhaps not the ideal solution, that may be able to fix the problem.

Figure 4:
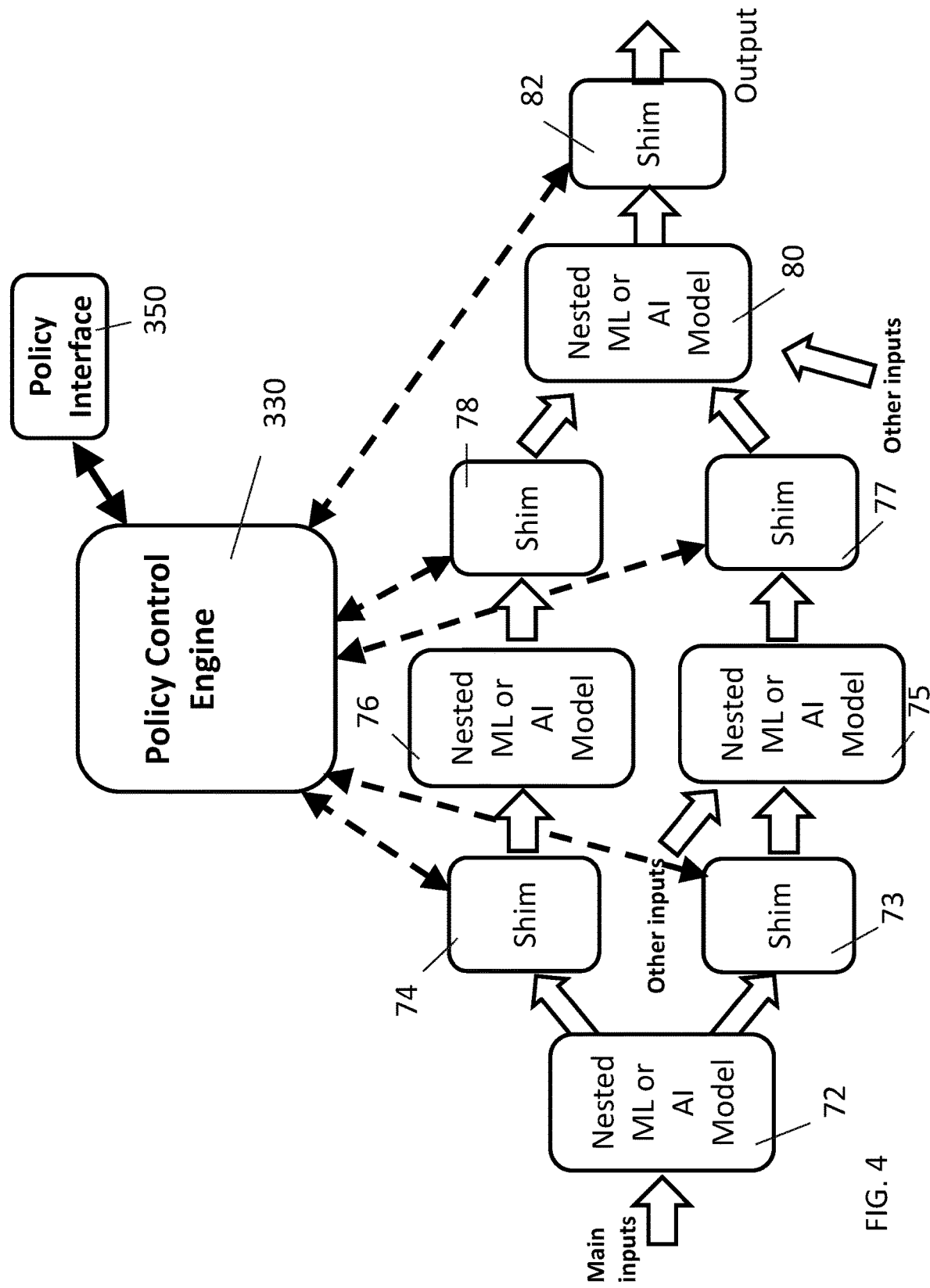
FIG. 4 is a representation of an exemplary ML/AI structure with multiple data flows.

With reference to FIG. 4, there is shown another example configuration of a policy managed ML/AI system. In this example, there are multiple nested ML/AI models 72, 75, 76, 80 that operate in serially and/or in parallel to act on main input data sets or streams and output results. Interspersed within the nested ML/AI models 72, 75, 76, 80 are policy shims 73, 74, 77, 78, and 82. There is a policy control engine 330 with a policy interface 350 available for user and/or machine-to-machine inputs. The policy control engine 330 is configured to provide policies or policy updates to shims 73, 74 77, 78 and 82 wherein the communication path is represented by the dashed arrows. Also shown is the possible entry of other inputs into nested ML/AI model 75 and nested ML/AI model 80.

In this configuration, the nested ML/AI model 72 will operate on the main inputs. The outputs of nested ML/AI model 72 will be fed into the policy control ships 73, 74 which may act to filter, modify, enhance or otherwise control those outputs prior to the outputs being ingested into nested ML/AI models 75, 76. ML/AI model 75 will then act on the output of policy shim 73 and other inputs to create an output to policy shim 77. Likewise, ML/AI model 76 will act on the output of policy shim 74 to create an output to policy shim 78. The outputs of policy shims 77, 78 would then be acted upon by nested ML/AI model 80 whose output may then be further operated on by output shim 82 to produce an output.

Figure 5:
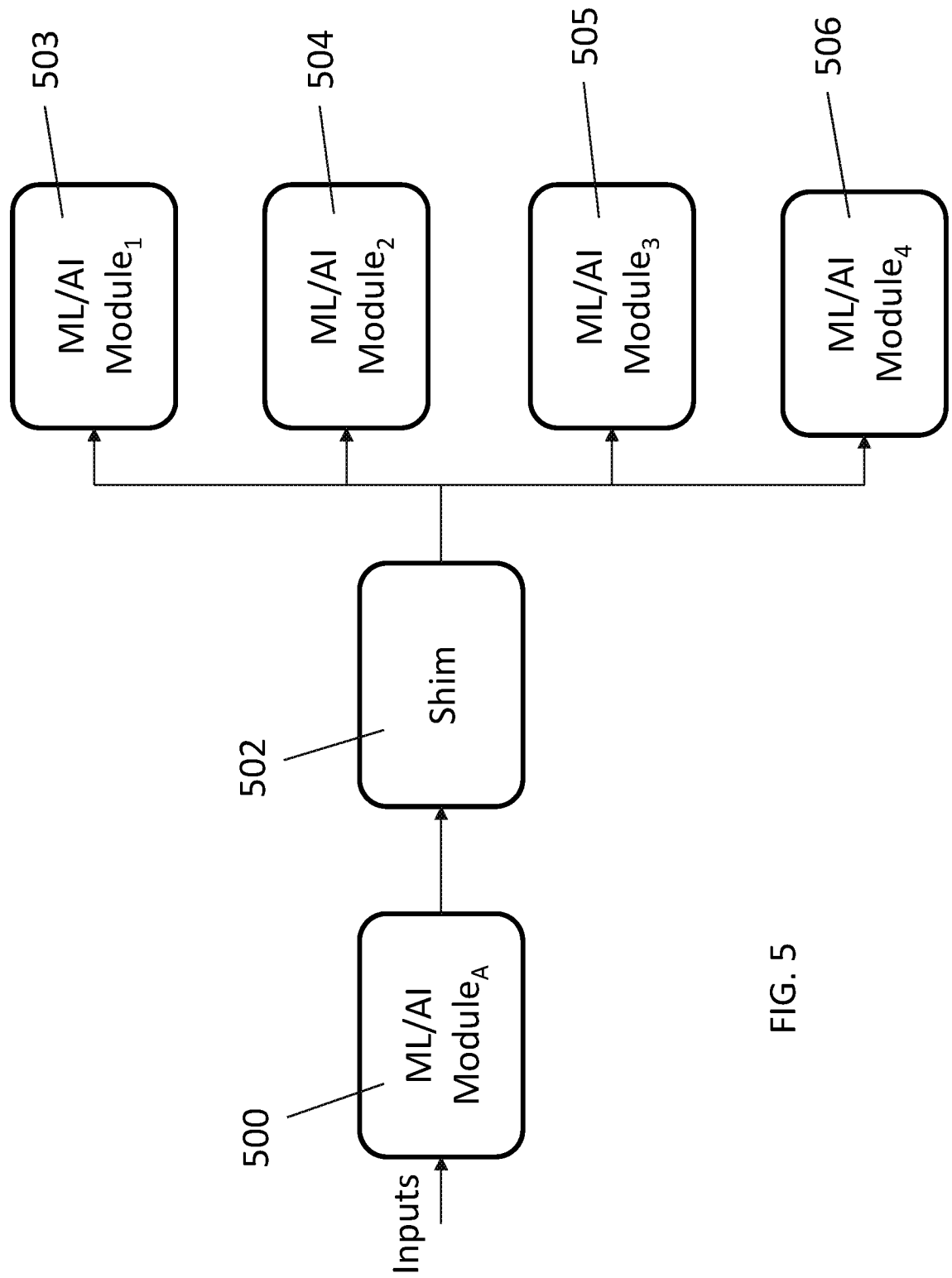
FIG. 5 is a representation of an exemplary ML/AI architecture in which a policy shim is used to determine the next ML/AI module to be executed.
Figure 6:
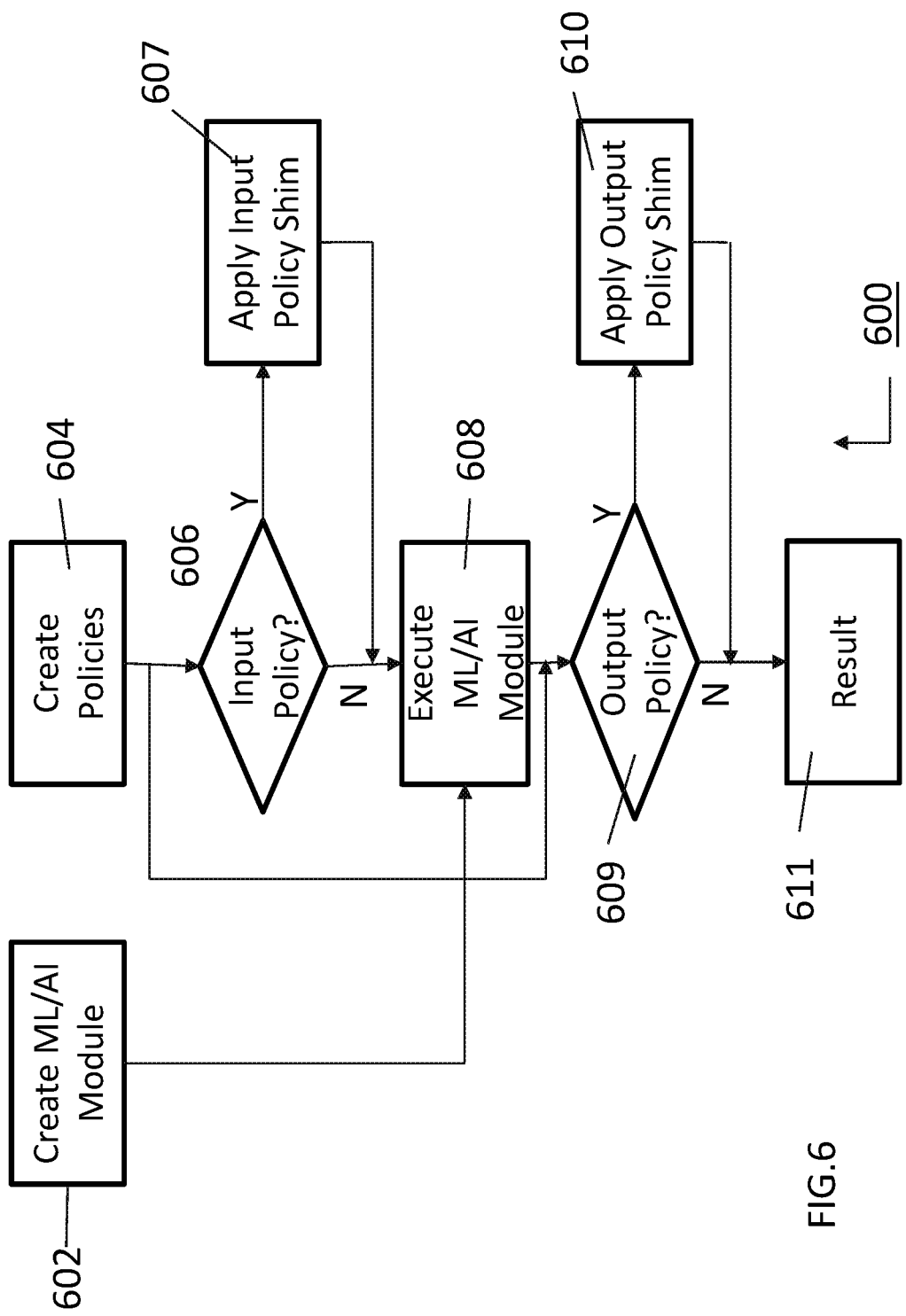
FIG. 6 is an exemplary flowchart of a method in accordance with the present disclosure.

With reference to FIG. 5, there is another example in which a policy shim may be used to select further processing. ML/AI Module$_A$ 500 may operate on inputs and derive an output on which policy shim 502 may operate. Depending on the policies and the output of ML/AI Module$_A$ 500, one or more of ML/AI Module$_1$ 503, ML/AI Module$_2$ 504, ML/AI Module$_3$ 505 or ML/AI Module$_4$ 505 may be selected for further processing. It will be understood that the various configuration shown in FIGS. 1-5 are exemplary only and any combination of ML/AI models or modules and policy shims may be implemented within the scope of the present disclosure and appended claims Methods of Use. With reference to FIG. 6, there is shown an exemplary process 600. At 602, a ML/AI module is created. This model may be trained with sample data sets such that it becomes configured and trained to operate on real data sets. Either serially or in parallel, a set of policies are created at 604. Alternatively, the policies may be preset and retrieved from a database at 604. At 606, an inquiry is made as to whether any of the policies are designed to operate on inputs to the ML/AI module. If so, an input policy shim is applied at 607 and the ML/AI module is executed at 608. If there is no input policy, then the ML/AI algorithm is executed at 608 without application of a policy shim. After the execution of the ML/AI algorithm at 608, an inquiry is made as to whether there is an output policy at 609. If so, the output policy shim is applied at 610 on the output of the ML/AI algorithm from 608 to derive the result at 611. If there is no output policy, then the result at 611 is the same as the output from the execution of the ML/AI module at 608.

Figure 7:
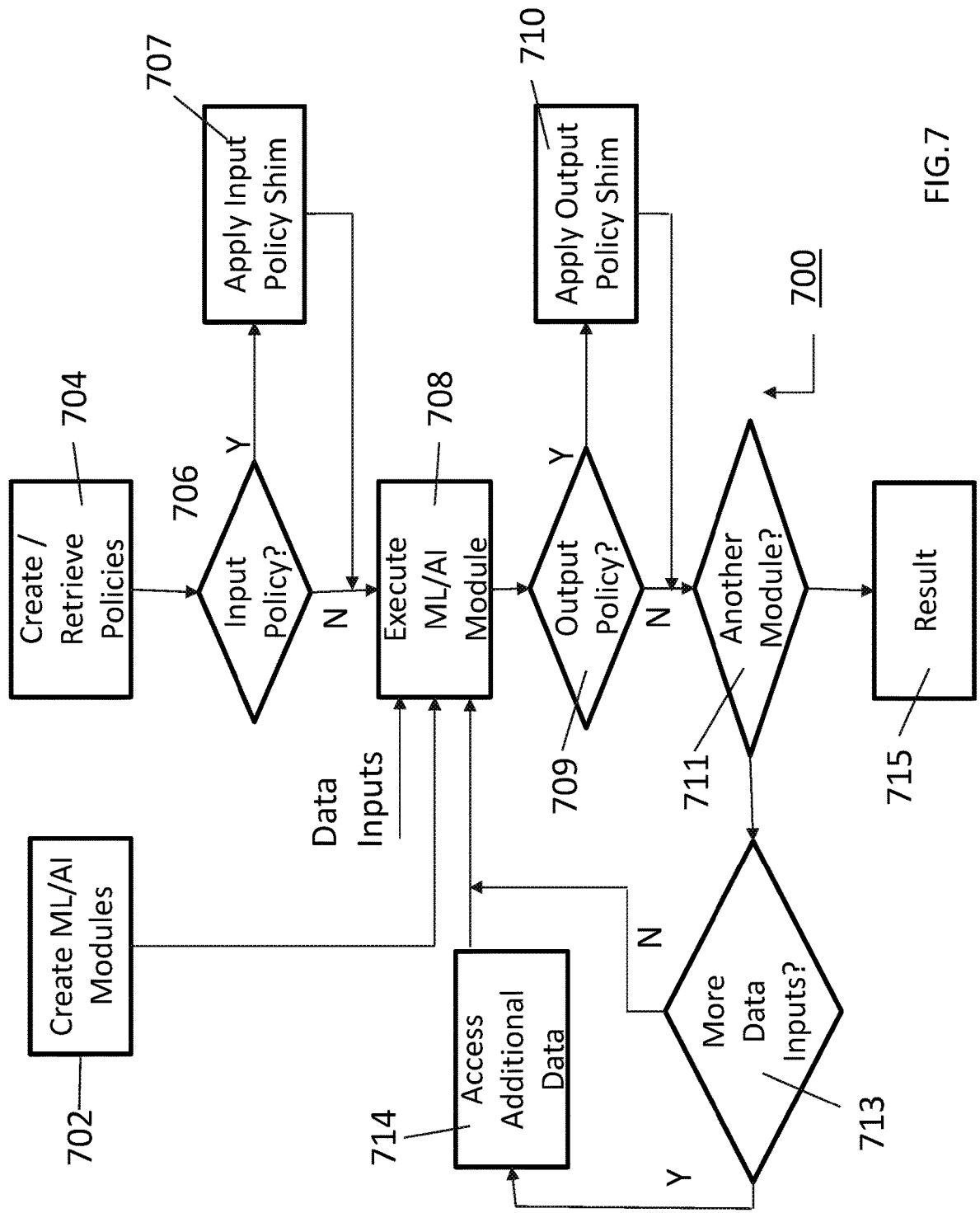
FIG. 7 is an exemplary flowchart of a method in accordance with an alternative aspect of the present disclosure.

With reference to FIG. 7, there is shown an exemplary process 700 in which multiple ML/AI modules may be nested and policy shims optionally added to the inputs, outputs or intermediate to the nested ML/AI modules. At 702, a ML/AI module is created. Either serially or in parallel, a set of policies are created at 704. Alternatively, the policies may be preset and retrieved from a database at 704. At 706, an inquiry is made as to whether any of the policies are designed to operate on inputs to the ML/AI module. If so, an input policy shim is applied at 707 and the ML/AI module is executed at 708. If there is no input policy, then the ML/AI algorithm is executed at 708 without application of a policy shim. After the execution of the ML/AI algorithm at 708, an inquiry is made as to whether there is an output policy at 709. If so, the output policy shim is applied at 710 on the output of the ML/AI algorithm from 708 is fed into decision block 711 to determine whether there is another ML/AI module to be executed. If there are other ML/AI modules, then the result is derived at 715 and the process concludes. If there are one or more additional ML/AI modules to be executed, a decision is made at block 713 to determine whether there are additional data inputs to be added to the next ML/AI module for processing. If so, the additional data inputs are accessed and retrieved at 714 and fed into the next ML/AI algorithm at 708. If there are no additional data inputs, then the next ML/AI module is executed. The process loop continues until there are no more ML/AI modules to be executed and the result is determined at 715.

Figure 8:
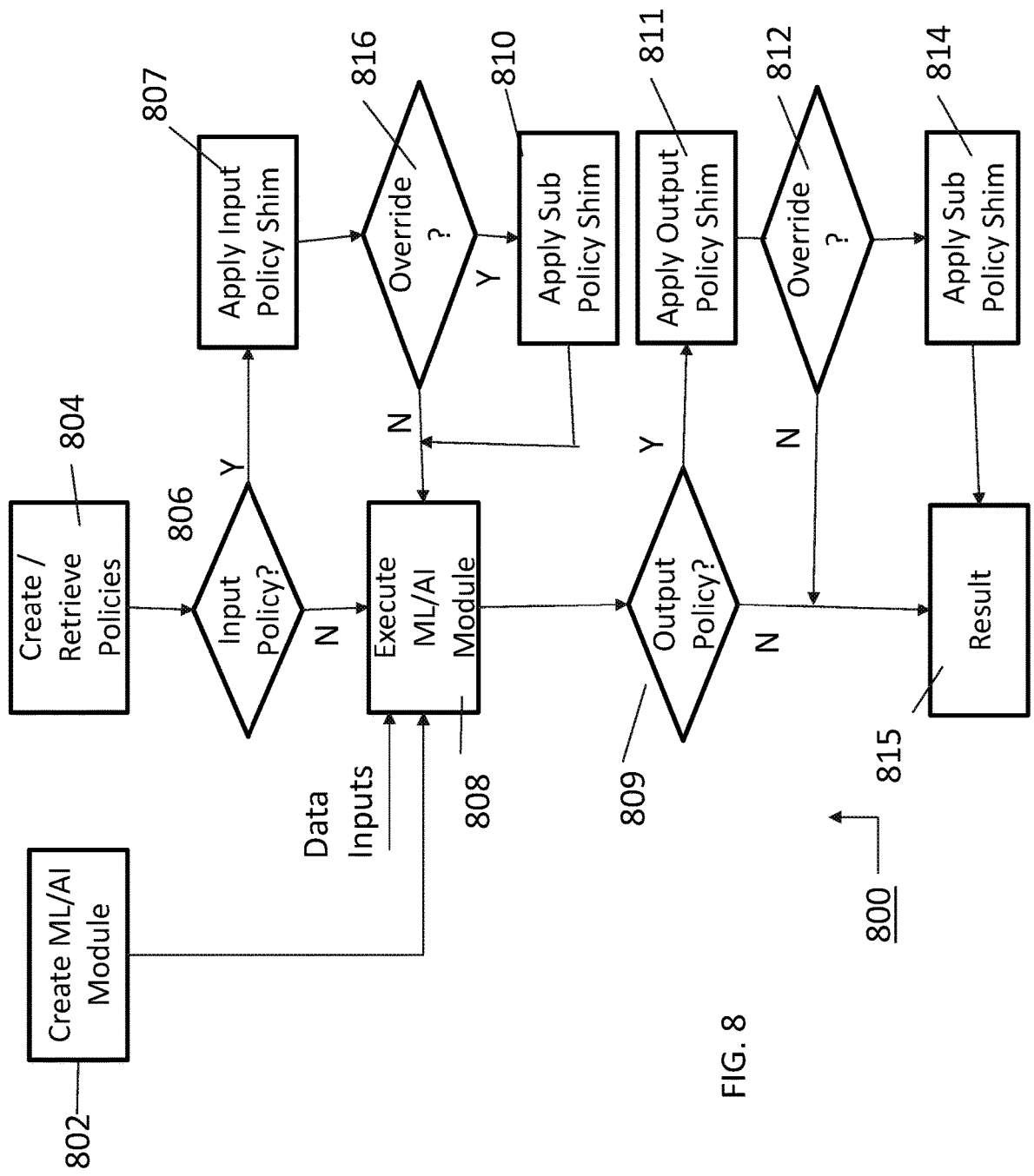
FIG. 8 is an exemplary flowchart of a method in accordance with another alternative aspect of the present disclosure.

With reference to FIG. 8, there is shown an exemplary process 800 in which the policy shims may be overridden based on a variety of conditions or events. At 802, a ML/AI module is created. Either serially or in parallel, a set of policies are created at 804. Alternatively, the policies may be preset and retrieved from a database at 804. At 806, an inquiry is made as to whether any of the policies are designed to operate on inputs to the ML/AI module. If so, an input policy shim is applied at 807. At 816, a decision block is made to see if there is an override designated for the input policy shim. If so, the substitute policy shim is applied at 810 and then ML/AI module is executed at 608. If there is no override selected at 816, then the ML/AI module is executed without applying any override policy shim. Likewise, if there is no input policy, then the ML/AI algorithm is executed at 808 without application of any policy shim. After the execution of the ML/AI algorithm at 808, an inquiry is made as to whether there is an output policy at 809. If so, the output policy shim is applied at 810. At 812, there is a decision block as to whether there is an override policy to be applied. If so, a substitute 814 policy is used to derive the result 815. If there is no override policy, then the output policy shim is applied to derive the result 815. If there is no output policy, then the result at 815 is the same as the output from the execution of the ML/AI module at 808.

Use Cases. The following are exemplary use cases for the systems and methods of the present disclosure. It will be noted by those skilled in the art that these use cases are not intended to be exhaustive. For the use cases identified below, "conditions" or "situations" may be defined by various combinations of inputs that match a set of particular policy parameters, including thresholds, null sets, extraneous conditions or other parameters.

Certain policies can add flexibility by providing simple methods to make a policy change. For example, a policy may be implemented to disallow situation A. With a simple change, the policy may then be changed to now allow situation A and disallow situation B. Another example would be to change "reduce situation C by 40%" to "reduce situation C by 60%." Still other examples would be to change "generate output via policy template 29" to "generate output via policy template 35" or make a policy change from "apply business policies 15 and 17" to "apply business polies 15 and 21." Those skilled in the art will understand that any number or type of policies may be easily changed in this regard.

Another use case example may be to aggregate and combine multiple inputs and outputs to produce a final output. For example, "if situation R, then use output 1;" " if situation S, then use output 2"; and "if situation T, use the higher of outputs 1 and 2." Such nesting of outputs can provide additional control of the ML/AI algorithms by the user.

Another use case example may be to decide which inputs or outputs to use, which in effect, is deciding how to use various approaches to generate the various inputs. For example, one approach may be "under condition 1, allow inputs from Model A, Model B, and Analytic C to the next module;" "under condition 2, allow inputs from Model A and Analytic C, but block Model B;" and "under condition 3, allow inputs from Models A, B, and Analytic C, but lock C to a fixed output value such as 0.56."

Another use case example may be to decide among a plurality of inputs or outputs depending on certain conditions. For example, one set of policies may be: "under condition green, allow outputs 1, 2 and 3 from source C to go to module y;" "under condition yellow, allow outputs 1 and 3 go to module y, but block 2 from going to module y;" and "under condition red, allow output 1 to go to module y, block output 2 from going to module y, and lock output 3 to a fixed value."

Another use case example may be to decide how to use each input and/or output which is useful for adding flexibility for tweaking. For example, one such decision tree would be, "under condition N, weight output 1 by 0.7 and output 2 by 0.3, then sum;" "under condition P, weight output 1 by 0.4 and output 2 by 0.6, then sum;" and "otherwise weight both output 1 and output 2 by 0.5, then sum."

Another use case example would be to provide policies that would make a final decision or recommendation while considering explicit business policies and preferences which may override the black box outputs. For example, there may be a business policy that sets forth "for customer class A, always roll a truck no matter what the recommendation otherwise would be," or "for any servers accessing the public internet, always traverse a firewall."

The present disclosure provides a flexible injection of explicit rules and or polices, such as decision rules, override rules, safety rules, or the like in ML/AI applications. Policies can be easily created and easily/quickly changed and may be as simple as desired or as complex as needed. The process may be used to tweak, refine, and experiment for best results or to quickly try different strategies is resolving problems. The disclosure provides a convenient way to implement company policies such as safety or business policies, to combine/arbitrate multiple outcomes (simultaneous and/or over time), to obtain different treatments for different types/classes of situations. The process permits the easy modification of policies as often as desired so that rules needing to be adjusted frequently can be modified without impacting the rest of the solution. Moreover, selected tactics and strategies may be trialed before incorporation into an otherwise static ML/AI algorithm.

One or more component models or sub-models could also be switched, selecting the best of each for current conditions from among a number of related but different versions. Using this hybrid approach, innovative types of feedback could be enabled by policy considerations as well, with the inputs being from outside the models/sub-models and/or inside those models/sub-models. Also, explicit business rules can be applied in various ways. The otherwise opaque behavior of each module, plus the solution as a whole, can thus be augmented or enhanced in order to give users/operators flexible control and explicit command of the system, ensuring practical ability to use ML/AI solutions. There is a framework around the ML/AI modules to enhance its functionality to provide additional controllability, thus making ML/AI more usable across more applications.

As shown, the disclosure permits the use of policy engines to enable key enhancements to ML/AI solutions needed for usability, without which the embrace of such advanced solutions in many use cases may be greatly slowed or avoided. The systems and methods of the disclosure is directed to a solving a practical problem by providing a real world and practical solution that removes or minimizes roadblocks likely to be encountered in many types of ML/AI use cases. The system and methods help enable the ease-of-use in practice, and can provide a comfort level of operator control for what would otherwise be an opaque black box that may help reduce uncertainty and add a measure of confidence to programmers, users and operators of such ML/AI systems. The present disclosure allows explicit incorporation of changing business directives and preferences into ML/AI solutions without the difficulty of changing or retraining the ML/AI algorithms.

The actual policies used may be simple or complex, and comprise one or multiple policies as needed, thereby enabling many various implementations. Policy control may be used to aggregate & combine multiple inputs/outputs, decide which inputs/outputs to use, in effect deciding how to use the different approaches that generated the various inputs, decide between multiple inputs/outputs from each source, decide how to use each input or output, make decisions or recommendations based on explicit business policies or preferences, prioritize recommendations and stage the communication of those recommendations, provide feedback loops, and permit experimentation and tweaking. The disclosure includes a front-end policy side to manage inputs to the ML/AI model and a back-end policy side to select outputs of ML/AI models.

While examples of systems and methods for adding policy control shims to ML/AI architecture have been described in connection with various computing devices/processors, the underlying concepts may be applied to any computing device, processor, or system capable of facilitating or hosting an ML/AI system, including cloud-based systems, proprietary systems or open source systems in which the framework of policy control of ML/AI solutions may be implemented. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
creating, by a processor, one or more first policy shims and one or more substitute policy shims for an input or an output of a machine learning module;
determining whether the one or more first policy shims comprises an input policy shim, wherein the input policy shim filters data supplied to the input of the machine learning module;
applying, by the processor, the one or more first policy shims to an input data set provided to the input of the machine learning module to filter the input data set responsive to a determination that the one or more first policy shims comprises the input policy shim;
applying, by the processor, the one or more substitute policy shims to the input data set provided to the input of the machine learning module responsive to a second determination of a first external input that the one or more substitute policy shims should override the input policy shim;
executing, by the processor, the machine learning module on a data set produced in response to the applying steps, thereby producing an output data set; and
applying, by the processor, the one or more first policy shims to the output data set produced by the machine learning module responsive to a third determination that the one or more first policy shims comprises an output policy shim.

2. The method of claim 1 wherein the machine learning module is one of a plurality of nested modules and the creating step includes creating one or more additional policy shims for at least one of the plurality of nested modules and wherein the applying steps apply the one or more additional policy shims to the one of the plurality of nested modules and wherein the executing step includes executing the plurality of nested modules in response to the applying steps.

3. The method of claim 2 wherein additional one or more data sets are inserted into the plurality of nested modules prior to the executing step.

4. The method of claim 1, further comprising overriding the output policy shim and applying the one or more substitute policy shims instead of the output policy shim.

5. The method of claim 1 further comprising storing, by the processor, the one or more first policy shims in a database and retrieving the one or more first policy shims prior to the applying steps.

6. The method of claim 1 wherein the one or more first policy shims are a filter configured to act on the data set.

7. The method of claim 1 wherein the one or more first policy shims are a set of business rules.

8. The method of claim 4, wherein the overriding the output policy shim is responsive to a fourth determination associated with a second external input.

9. The method of claim 8 wherein the first external input is one of a weather alert and an emergency alert.

10. The method of claim 8 wherein the first external input is one or more business rules.

11. The method of claim 1 wherein the machine learning module is modified based on the executing steps and whereby the one or more first policy shims are no longer used.

12. An apparatus comprising:
a policy database configured for storing a plurality of policies;
an input-output interface;
a processor coupled to the input-output interface wherein the processor is coupled to a memory, the memory having stored thereon executable instructions that when executed by the processor cause the processor to effectuate operations comprising:
creating one or more first policy shims from the plurality of policies and one or more substitute policy shims;
determining whether the one or more first policy shims comprises an input policy shim wherein the input policy shim filters data supplied to an input of a machine learning module;
applying the input policy shim to an input data set provided to the input of the machine learning module to filter the input data set responsive to a determination that the one or more first policy shims comprises the input policy shim;
applying the one or more substitute policy shims to the input data set provided to the input of the machine learning module responsive to a second determination of a first external input indicating the one or more substitute policy shims should override the input policy shim; and
executing the machine learning module on a data set produced in response to the applying steps thereby producing an output data set; and
applying the one or more first policy shims to the output data set produced by the machine learning module responsive to a third determination that the one or more first policy shims comprises an output policy shim.

13. The apparatus of claim 12 wherein the operations further comprise creating a first substitute policy shim and receiving, via the input-output interface, an input from an external source and overriding the one or more first policy shims with the first substitute policy shim.

14. The apparatus of claim 13 wherein the first substitute policy shim is a filter or a business rule.

15. The apparatus of claim 12 wherein the operations further comprise creating a safety policy shim and receiving, via the input-output interface, an input from an external source and overriding the one or more first policy shims with the safety policy shim.

16. The apparatus of claim 15 wherein the safety policy shim is a filter or a business rule to be applied based on a safety concern.

17. A non-transitory computer-readable storage medium comprising instructions that, when executed by a processor, facilitate a performance of operations, the operations comprising:
creating one or more first policy shims and one or more substitute policy shims to be applied to a machine learning module;
applying the one or more first policy shims to an input data set provided to an input of the machine learning module to filter the input data set responsive to a determination that the one or more of the first policy shims comprise input policy shims that filter data supplied to the input of the machine learning module;
applying the one or more substitute policy shims to the input data set provided to the input of the machine learning module responsive to a second determination of a first external input that the one or more substitute policy shims should override the one or more first policy shims;
executing the machine learning module on a second data set produced in response to the applying steps, thereby producing an output data set; and
applying the one or more first policy shims to the output data set produced by the machine learning module responsive to a third determination that the one or more first policy shims comprises an output policy shim.

18. The non-transitory computer-readable storage medium of claim 17, wherein the one or more first policy shims comprise a filter configured to act on the second data set.

* * * * *